US011315711B2

(12) United States Patent
Perigo et al.

(10) Patent No.: US 11,315,711 B2
(45) Date of Patent: Apr. 26, 2022

(54) SINTERED MAGNET, ELECTRICAL MACHINE, USE OF THE SINTERED MAGNET FOR AN ELECTRICAL MACHINE AND MANUFACTURING METHOD OF A SINTERED MAGNET

(71) Applicant: ABB Schweiz AG, Baden (CH)

(72) Inventors: Elio Perigo, Raleigh, NC (US); Darren Tremelling, Raleigh, NC (US); Jacim Jacimovic, Wettingen (CH); Nikolaus Zant, Raleigh, NC (US); Reinhard Simon, Baden (CH); Lorenz Herrmann, Brugg (CH); Felix Greuter, Baden-Rütihof (CH)

(73) Assignee: ABB Schweiz AG, Baden (CH)

( * ) Notice: Subject to any disclaimer, the term of this patent is extended or adjusted under 35 U.S.C. 154(b) by 430 days.

(21) Appl. No.: 16/449,737

(22) Filed: Jun. 24, 2019

(65) Prior Publication Data

US 2019/0311827 A1    Oct. 10, 2019

Related U.S. Application Data

(63) Continuation-in-part of application No. PCT/EP2016/082512, filed on Dec. 23, 2016.

(51) Int. Cl.
*H01F 1/08* (2006.01)
*H01F 7/02* (2006.01)
(Continued)

(52) U.S. Cl.
CPC .............. *H01F 1/086* (2013.01); *H01F 7/02* (2013.01); *H01F 7/021* (2013.01);
(Continued)

(58) Field of Classification Search
CPC . H01F 1/086; H01F 7/02; H01F 7/021; H01F 41/0266; H02K 1/02; H02K 15/02; Y02E 10/72
See application file for complete search history.

(56) References Cited

U.S. PATENT DOCUMENTS

2009/0252865 A1    10/2009   Sagawa
2015/0179320 A1    6/2015    Furusawa et al.
(Continued)

FOREIGN PATENT DOCUMENTS

CN    103443885 A    12/2013
CN    104388951 A    3/2015
(Continued)

OTHER PUBLICATIONS

Japanese Patent Office, Office Action issued in corresponding Application No. 2019-534229, dated Aug. 18, 2020, 6 pp.
(Continued)

*Primary Examiner* — Mohamad A Musleh
(74) *Attorney, Agent, or Firm* — Greenberg Traurig, LLP

(57) ABSTRACT

A sintered magnet, the sintered magnet including a core portion, a shell portion arranged at an outer part of the sintered magnet, and a diffusion portion arranged at least partially between the core portion and the shell portion. The shell portion has a coercivity, which is at least 30 kA/m larger than the coercivity of the core portion. In the diffusion portion, the coercivity is not less than the coercivity of the core portion and not larger than the coercivity of the shell portion and the value of the coercivity gradually increases from the core portion towards the shell portion. The thickness of the core portion is not less than 1 mm and the total thickness of the shell portion and the diffusion portion is at least 5 mm.

32 Claims, 5 Drawing Sheets

(51) Int. Cl.
  *H01F 41/02* (2006.01)
  *H02K 1/02* (2006.01)
  *H02K 15/02* (2006.01)
(52) U.S. Cl.
  CPC ........... *H01F 41/0266* (2013.01); *H02K 1/02* (2013.01); *H02K 15/02* (2013.01); *Y02E 10/72* (2013.01)

(56) References Cited

U.S. PATENT DOCUMENTS

| | | | |
|---|---|---|---|
| 2016/0148735 A1 | 5/2016 | Delette et al. | |
| 2017/0154713 A1* | 6/2017 | Simon | B23K 15/0086 |
| 2019/0051434 A1* | 2/2019 | Zakotnik | C22C 38/00 |

FOREIGN PATENT DOCUMENTS

| | | |
|---|---|---|
| DE | 202005019268 U1 | 3/2006 |
| EP | 2605253 A1 | 6/2013 |
| JP | S6237907 A | 2/1987 |
| JP | 2006261433 A | 9/2006 |
| JP | 2010098080 A | 4/2010 |
| WO | 2014056773 A2 | 4/2014 |
| WO | 2016023961 A1 | 2/2016 |

OTHER PUBLICATIONS

Chinese Patent Office, Office Action issued in corresponding Application No. 201680091802.5, dated Sep. 27, 2020, 15 pp.

China Third Office Action and Search Report, issued by the China Patent Office, regarding corresponding patent application Serial No. CN201680091802.5; dated Sep. 3, 2021; 8 pages (English Translation—10 pages).

European Patent Office, International Search Report & Written Opinion issued in corresponding Application No. PCT/EP2016/082512, dated Oct. 6, 2017, 18 pp.

Decision to Grant (Notification to go through Formalities of Registration), issued by the Chinese National Intellectual Property Administration, regarding corresponding patent application Serial No. CN 201680091802.5, dated Jan. 4, 2022; 7 pages (with Translation).

* cited by examiner

SINTERED MAGNET, ELECTRICAL MACHINE, USE OF THE SINTERED MAGNET FOR AN ELECTRICAL MACHINE AND MANUFACTURING METHOD OF A SINTERED MAGNET

TECHNICAL FIELD

Embodiments of the present disclosure relate to a sintered magnet, an electrical machine, a use of the sintered magnet for an electrical machine and a manufacturing method of a sintered magnet.

BACKGROUND

Magnetic materials for applications in an electrical machine, such as high-torque motors and wind generators, need to satisfy a number of requirements, such as withstand operating temperatures ranging from 20° C. to 300° C., or even higher than 300° C., exhibit high coercivity and high remanence. However, such operating temperatures greatly impair the properties of the magnetic materials and may even result in demagnetization. For example, the resistance to demagnetization (coercivity) of the magnetic materials decreases with the temperature increase. One possible approach for this problem is the selection of magnetic materials which maintain a high coercivity and a high remanence even while being subjected to temperatures ranging from 20° C. to 300° C. A typical example for such materials are rare earth based magnets. Since the mining processes of rare earth elements are laborious and time-consuming the use of these elements in a magnet greatly increases the total costs of the magnet.

One approach to lower the total costs of a magnet suitable for applications in an electrical machine is optimizing its design. For example, in the international patent application WO 2016/023961 A1, a magnet having regions of different magnetic properties is described. The described magnet has regions having a high value of coercivity and regions having a lower value of coercivity, whereas the regions having a high value of coercivity are arranged selectively in those areas of the magnet where enhanced magnetic characteristics are required. Since only the regions having a high value of coercivity need to contain rare earth elements the total amount of expensive rare earth elements can be reduced. According to WO 2016/023961 A1, such designed magnets can be produced by building a magnetic layer using selective laser melting or spark plasma sintering. However, these methods are time-consuming and/or cost-effective and impose several restrictions on design possibilities. Therefore, these methods are presently not industrially implemented.

Hence, it is desirable to create a magnet which is suitable for the application in an electrical machine, which withstands operating temperatures ranging from 20° C. to 300° C., or even higher than 300° C., which exhibits high coercivity and high remanence and, at the same time, has a reduced amount of expensive magnetic materials.

SUMMARY

In light of the above, according to embodiments disclosed herein, a sintered magnet, an electrical machine, a use of the sintered magnet for an electrical machine and a manufacturing method of a sintered magnet are provided.

According to a first aspect of the present disclosure a sintered magnet, in particular for an electrical machine is provided. The sintered magnet includes a core portion, a shell portion arranged at an outer part of the sintered magnet, and a diffusion portion arranged between the core portion and the shell portion at least partially, wherein the shell portion has a coercivity which is at least 30 kA/m larger than the coercivity of the core portion, wherein, in the diffusion portion, the coercivity is not less than the coercivity of the core portion and not larger than the coercivity of the shell portion and the value of the coercivity gradually increases from the core portion towards the shell portion, and wherein the thickness of the core portion is not less than 1 mm and the total thickness of the shell portion and the diffusion portion is at least 5 mm.

According to a second aspect of the present disclosure an electrical machine is provided. The electrical machine includes at least one sintered magnet according to the first aspect of the present disclosure described above.

According to a third aspect of the present disclosure a use of the sintered magnet according to the first aspect of the present disclosure described above is provided for an electrical machine.

According to a fourth aspect, a manufacturing method of a sintered magnet is provided. The method includes forming a green body by magnetically aligning, and optionally compressing, a first magnetic powder and a second magnetic powder so that the second magnetic powder is provided on at least a portion of the first magnetic powder, sintering the green body in a sintering furnace, and optionally annealing the sintered green body, to form a sintered magnet having a core portion, a shell portion and a diffusion portion that is located between the core portion and the shell portion at least partially, wherein the shell portion has a coercivity which is at least 30 kA/m larger than the coercivity of the core portion, wherein, in the diffusion portion, the coercivity is not less than the coercivity of the core portion and not larger than the coercivity of the shell portion and the value of the coercivity gradually increases from the core portion towards the shell portion, and wherein the thickness of the core portion is not less than 1 mm and the total thickness of the shell portion and the diffusion portion is at least 5 mm.

Further aspects, advantages, and features of the present disclosure are apparent from the dependent claims and the description.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following. Typical embodiments are depicted in the drawings and are detailed in the description which follows.

DETAILED DESCRIPTION

Figure 1A:
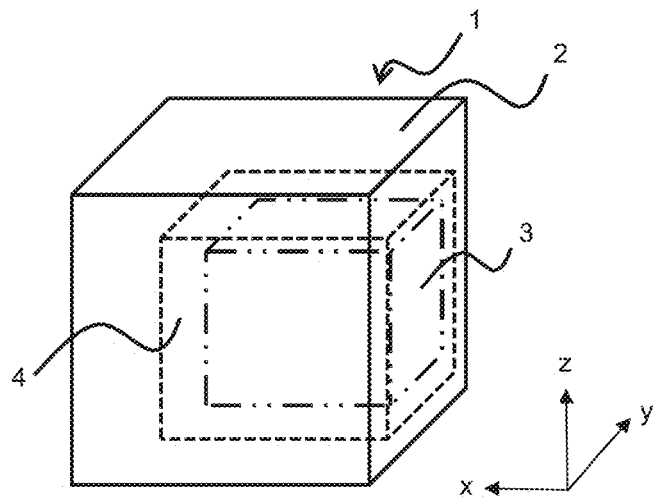
FIG. 1a shows a schematic illustration for a sintered magnet according to embodiments described herein in 3D-view, front view, side view and top view.
Figure 1A:
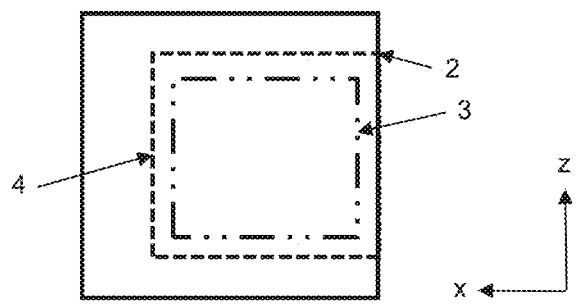
Figure 1A:
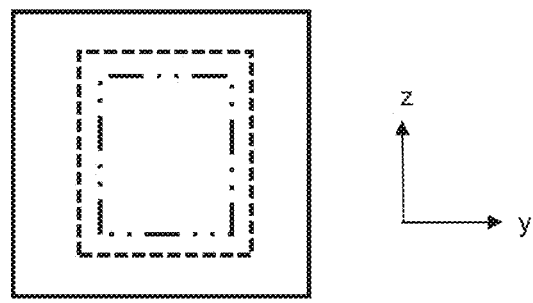
Figure 1A:
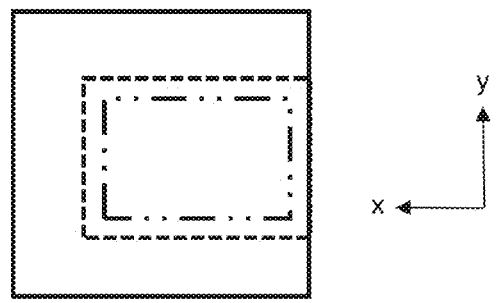

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Before describing individual embodiments, first some general definitions and aspects of the invention are described, which can each be combined with any other aspect or embodiment.

An electrical machine as used herein encompasses machines which convert, produce or consume electric energy. For example, the term electrical machine includes an electromechanical energy converter, such as a transformer, an electric motor, an electric generator, or an electromagnetic actuator. Further, the electrical machine as used herein may occur in the form of a rotating machine or a linear machine.

The electrical machine as used herein may include a rotor and a stator. The electrical machine as used herein preferably have magnets arranged at or in the rotor. The magnets are preferably arranged at or in the rotor so that multiple magnetic poles project from the rotor radially, axially or transversely.

A sintered magnet as used herein refers to a magnet which is produced by a sintering process. A sintering process in accordance with the present disclosure is a process which includes compacting and forming a starting material which is a solid mass material, for example powder material, by heating and/or pressing the starting material without melting it. The sintering process may be pressureless. This means that the compacting step is optional. As a result, a sintered magnet is different from a cast magnet, an injection molded magnet or an extruded magnet.

The term "coercivity" as used herein refers to the coercivity at operating temperatures, wherein operating temperatures range from 20° C. to 300° C.

A sintered magnet according to the present disclosure includes a core portion, a shell portion arranged at an outer part of the sintered magnet, and a diffusion portion arranged between the core portion and the shell portion.

The core portion forms the innermost part of the sintered magnet. The core portion is completely or partly covered by the diffusion portion. The shell portion forms an outer part of the sintered magnet and completely or partly covers the diffusion portion. The regions of the core portion which are not covered by the diffusion portion may be completely or partly covered by the shell portion. However, there may be regions of the core portion which are neither covered by the diffusion portion nor by the shell portion. In other words, the diffusion portion completely or partly surrounds the core portion. The shell portion completely or partly surrounds the diffusion portion and/or the core portion. The core portion and the shell portion can have the same or a different geometrical shape. Preferably, the core portion and/or the shell portion have a rectangular or an elliptical cross-section.

More preferably, the core portion and/or the shell portion have the shape of a cuboid, e.g. a rectangular cuboid, a cube, a sphere, a pyramid, a full torus, a hollow cylinder, a circular cylinder or a cone. In the context of the present application, when the shape of the core portion and/or the shell portion is described the term "shape" may describe the solid form or hollow form of the core portion and/or the shell portion or may describe only the outer appearance of the core portion and/or the shell portion. For example, the core portion is a solid form whereas the shell portion is a hollow form which partly or completely embraces the core portion.

Figure 1B:
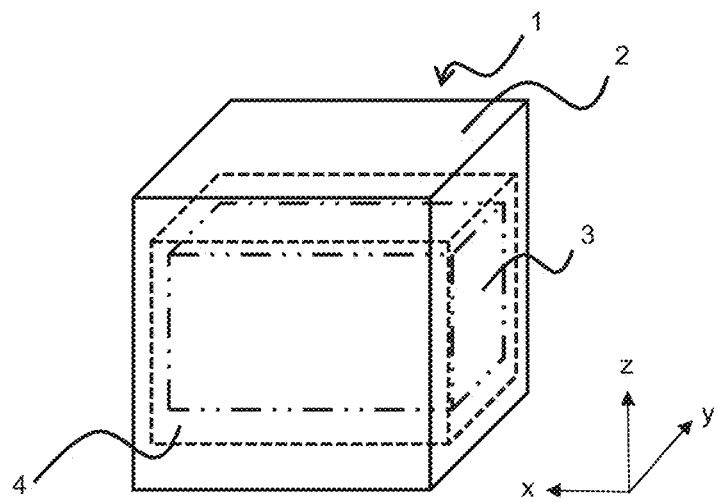
FIG. 1b shows a schematic illustration for a further sintered magnet according to embodiments described herein in 3D-view, front view, side view and top view.
Figure 1B:
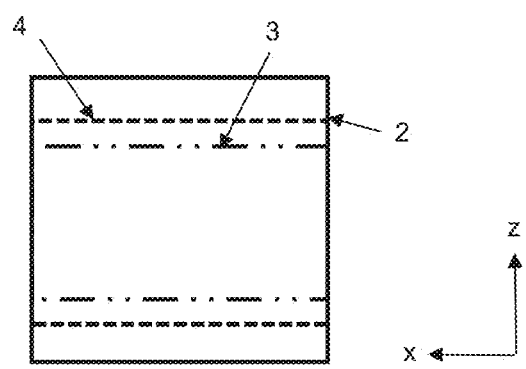
Figure 1B:
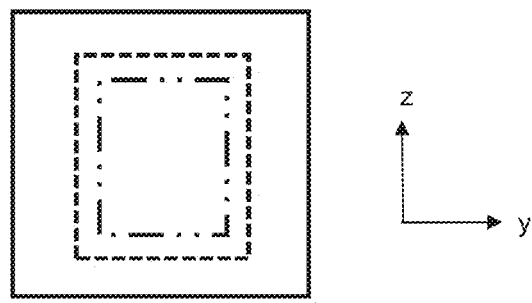
Figure 1B:
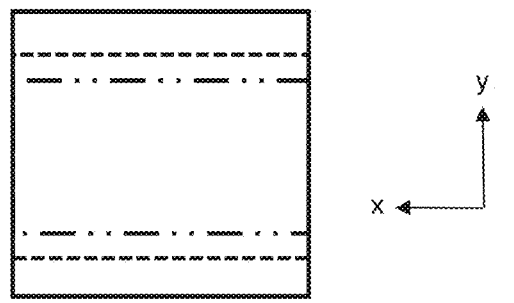
Figure 1C:
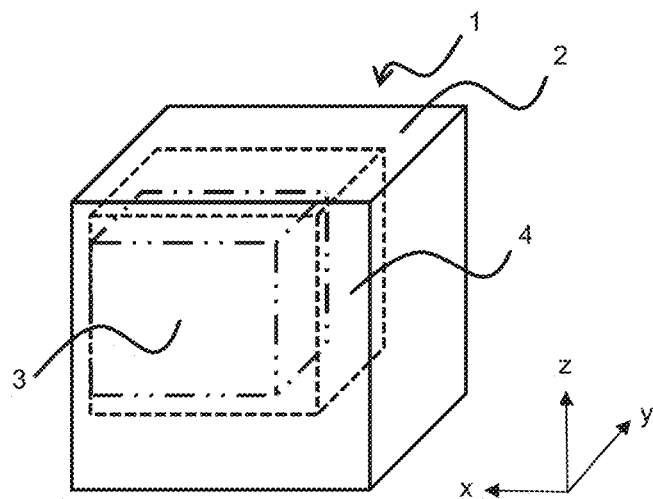
FIG. 1c shows a schematic illustration for yet a further sintered magnet according to embodiments described herein in 3D-view, front view, side view and top view.
Figure 1C:
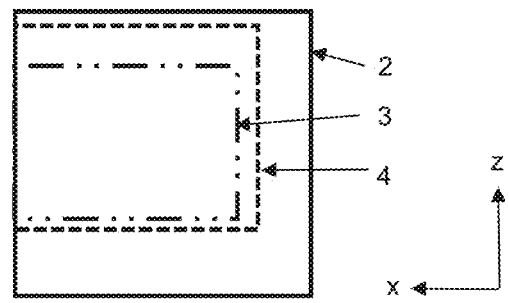
Figure 1C:
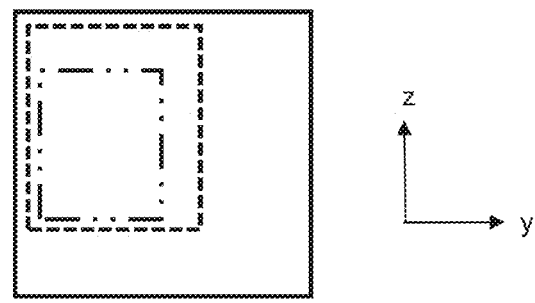
Figure 1C:
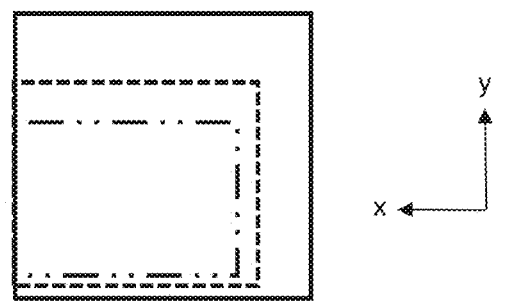

In FIGS. 1a, 1b and 1c examples for a possible design of a sintered magnet 1, 10, 100, i.e. a sintered magnet body are shown. As can be seen from these FIGS. 1a, 1b and 1c, the core portion 3 has a rectangular cuboid shape (shown in long dash-dot-dot lines) and forms the innermost part of the sintered magnet 1, 10, 100. The shell portion 2 (shown in straight/contour lines) is arranged at an outer part of the sintered magnet 1, 10, 100 and surrounds a diffusion portion 4 at least partly. The diffusion portion 4 surrounds the core portion 3 at least partly. In all three embodiments, the same or functionally identic portions have been given the same reference characters.

In the embodiment according to FIG. FIG. 1a, the cuboid shape of the core portion 3 is located out of the center with respect to the cuboid shaped magnet 1. However, the diffusion portion 4 surrounds the core portion 3 completely. Moreover, the shell portion 2 surrounds the diffusion portion 4 on five out of its six faces. The relative distances between the faces of the cuboid shaped diffusion portion 4 and the faces of the cuboid shaped core portion 3 are about even.

In the embodiment according to FIG. FIG. 1b, the cuboid shape of the core portion 3 is located about centric with respect to a longitudinal axis of the cuboid shaped magnet 1 extending horizontally in the direction x. The diffusion portion 4 surrounds the core portion 3 on four side faces when seen in the direction x, i.e. in plane y-z. Likewise, the shell portion 2 surrounds the diffusion portion 4 on four side faces when seen in the direction x, i.e. in plane y-z. The relative distances between the faces of the cuboid shaped diffusion portion 4 and the faces of the cuboid shaped core portion 3 are about even.

In the embodiment according to FIG. FIG. 1c, the cuboid shape of the core portion 3 is located displaced with respect to a longitudinal axis of the cuboid shaped shell portion 2 extending horizontally in the direction x and the center of the magnet 1. When seen in the direction y, i.e. in plane x-z, one face of the core portion 3 and one face of the diffusion portion 4 are located in the same plane defined by the face of the shell portion 2. In addition, the relative distances between the faces of the cuboid shaped diffusion portion 4 and the faces of the cuboid shaped core portion 3 differ to one another as they have been adjusted to meet specific requirements to this embodiment of the magnet 1. This embodiment shows that the shell portion as well as the diffusion portion 4 and the core portion 3 can been designed freely in accordance to the present invention.

The different portions of the sintered magnet have different magnetic properties. The shell portion has a coercivity which is at least 30 kA/m, (in alternative aspects by at least 10 kA/m, preferably by 20 kA/m) larger than the coercivity of the core portion. This means that the ability of the shell portion to withstand an external magnetic field without becoming demagnetized is greater than that of the core portion. The diffusion portion is a portion of the sintered magnet which is formed by performing a diffusion process with the core portion and the shell portion. During the diffusion process a part of the materials of the core portion and a part of the materials of the shell portion are mixed with each other, thereby resulting in the diffusion portion. In other words, a part of the core portion and/or a part of the shell portion are consumed in order to form the diffusion portion. Hence, the magnetic properties of the diffusion portion lie in between the magnetic properties of the core portion and the shell portion. Namely, the diffusion portion has a coercivity which is not less than the coercivity of the core portion and not larger than the coercivity of the shell portion. In other words, the coercivity of the diffusion portion lies in between the coercivity of the core portion and the coercivity of the shell portion. In the diffusion portion, the value of the coercivity gradually increases from the core portion towards the shell portion. In other words, the part of the diffusion portion being close to the core portion has a coercivity which is smaller than the coercivity of the part of the diffusion portion being close to shell portion. The diffusion process is initiated during the sintering, in particular during the heating process, of the magnet.

Usually, the material used for the portion having a higher coercivity is more expensive than the material which is used for the portion having a lower coercivity. Hence, by applying the portion having a higher coercivity, namely the shell portion, only at positions where a high coercivity is needed instead of making the whole magnet of the portion having a higher coercivity, the overall magnet costs can be decreased without any loss of performance of the magnet. Having the diffusion portion located between the portion having a higher coercivity, i.e. the shell portion, and the portion having a lower coercivity, i.e. the core portion, a strong bond between two different materials, namely the portion having a higher coercivity and the portion having a lower coercivity, is obtained. The material bond realized by the diffusion portion is much more reliable than any other connection, such as a braze joint, a solder joint or an adhesive bond joint, in terms of mechanical stability.

The thickness of the core portion is not less than 1 mm and the total thickness of the shell portion and the diffusion portion is at least 5 mm. This means that the thickness of the sintered magnet is at least 6 mm in regions in which the core portion is covered by the diffusion portion and/or the shell portion. Preferably, the thickness of the core portion is not less than 3 mm and the total thickness of the shell portion and the diffusion portion is at least 8 mm. More preferably, the thickness of the core portion is not less than 3 mm and the total thickness of the shell portion and the diffusion portion is at least 10 mm. The thickness of the core portion, the shell portion and the diffusion portion may not be constant over their respective entire dimension. The thickness of a certain portion, i.e. the core portion, the shell portion or the diffusion portion, of the sintered magnet as used herein is defined as the smallest thickness of the respective portion over its entire dimension.

With the realization of a total thickness of the shell portion and the diffusion portion being at least 5 mm, the disadvantages of known manufacturing methods are overcome and such magnets can be deployed in high-torque motors and wind generators without any drawback. In contrast, by applying known methods like grain boundary diffusion processes only a thickness of the whole magnet of up to 5 mm can be realized. Hence, the thickness of the magnetic region having a high value of coercivity is also restricted in thickness. Since electrical machines, such as high-torque motors and wind generators, require a thicker layer of enhanced coercivity in comparison to that provided by grain boundary diffusion process, magnets produced by the above-mentioned known methods, such as grain boundary diffusion processes, are not suitable for such electrical machines.

The sintered magnet according to the present disclosure provides a core-shell magnet design which allows a magnetic material having enhanced magnetic properties, such as high coercivity and high remanence, to be precisely located at the regions where such enhanced magnetic properties are needed, thereby allowing the sintered magnet to withstand operating temperatures ranging from 20° C. to 300° C., or even higher than 300° C. For example, the core-shell magnet is such designed that the shell portion exhibits a higher coercivity and the core portion exhibits a higher remanence. By only selectively using a magnetic material having enhanced magnetic properties a reduction in the use of pricey materials is achieved.

Through this improved material utilization the shell portion can be finely tuned and only applied at locations where enhanced magnetic properties are needed. As a consequence of the reduction in the use of expensive materials, such as heavy rare earth elements, the overall costs of the sintered magnet can be decreased in comparison to the production costs of a magnet using the manufacturing method described in WO 2016/023961 A1.

According to embodiments described herein, the overall volume of the sintered magnet is in the range of 600 to $80 \cdot 10^6$ mm$^3$, preferably in the range of 700 to $30 \cdot 10^6$ mm$^3$, more preferably in the range of 1000 to $3 \cdot 10^6$ mm$^3$. In case that the sintered magnet has a rectangular cuboid shape, the length of the sintered magnet is in the range of 1 to 1000 mm, preferably in the range of 5 to 800 mm, and more preferably in the range of 10 to 500 mm; the width is in the range of 5 to 800 mm, preferably in the range of 10 to 600 mm, and more preferably in the range of 15 to 500 mm; and the thickness in the range of at least 3 to 100 mm, preferably in the range of 8 to 80 mm, and more preferably in the range of 10 to 50 mm.

According to embodiments described herein, the diffusion portion has a coercivity gradient $|\nabla Hc|$ of at least 5 (kA/m)/mm throughout the diffusion portion. Preferably, the diffusion portion has a coercivity gradient $|\nabla Hc|$ of at least 10 (kA/m)/mm throughout the diffusion portion, more preferably the diffusion portion has a coercivity gradient $|\nabla Hc|$ of at least 15 (kA/m)/mm throughout the diffusion portion. Preferably, the diffusion portion has a coercivity gradient $|\nabla Hc|$ of at most 100 (kA/m)/mm, more preferably of at most 50 (kA/m)/mm, even more preferably at most 35 (kA/m)/mm, throughout the diffusion portion. The coercivity gradient is a space-averaged gradient over a length scale of at least 5 mm. The coercivity gradient specifies that the value of the coercivity is not constant over the whole diffusion portion. The value of the coercivity increases from the region of the diffusion portion being adjacent to the core portion towards the region of the diffusion portion being adjacent to the shell portion. The advantage of the gradual change of the value of the coercivity throughout the diffusion portion is that the material properties, in particular the magnetic properties, do not abruptly change at the transition from the core portion to the shell portion but smoothly change over the whole length of the diffusion portion.

According to embodiments described herein, the average density of the sintered magnet is 4.0 g/cm$^3$ to 8.5 g/cm$^3$. The absolute value of the density at any location of the sintered magnet, for example in the core portion, in the diffusion portion or in the shell portion, is in the range of 2.0 g/cm$^3$ to 20 g/cm$^3$, preferably in the range of 4.0 g/cm$^3$ to 15 g/cm$^3$, more preferably in the range of 5.0 g/cm$^3$ to 10 g/cm$^3$.

According to embodiments described herein, the coercivity of the core portion is at least 300 kA/m and less than 5000 kA/m and the coercivity of the shell portion is not more than 5000 kA/m. Preferably, the coercivity of the core portion is at least 1000 kA/m and less than 5000 kA/m and the coercivity of the shell portion is not more than 4000 kA/m. More preferably, the coercivity of the core portion is at least 1500 kA/m and less than 4000 kA/m and the coercivity of the shell portion is not more than 3000 kA/m. The lower limit for the coercivity of the shell portion is at least 500 kA/m, preferably at least 800 kA/m, and more preferably at least 1000 kA/m.

According to embodiments described herein, the core portion includes an alloy comprising at least one composition of elements a) to l) selected from group I and, optionally, at least one element selected from group II, group I:
a) Al, Ni and Co;
b) Sm and Co;
c) Sm and Fe;
d) Sm, Fe and N;
e) Fe and N;
f) Mn, Al and C;
g) Mn and Bi;
h) hard ferrite;
i) Fe, B, and at least one rare earth element;
j) Fe, C, and at least one rare earth element;
k) Nd, Fe and B
l) Nd, Fe, B, and at least one rare earth element; and
group II:
Al, Co, Cu, Ga, Nb, Ti, Zr, and at least one light rare earth element.

The abbreviations for the chemical elements mentioned in group I and II are those known from the periodic table of chemical elements. The same holds true for the whole document accordingly.

Preferably, the core portion consists of an alloy comprising at least one composition of elements a) to l) selected from group I and, optionally, at least one element selected from group II.

By selecting composition of elements a), e) or j) for the core portion particularly inexpensive magnets can be obtained. Thereby, the production costs of the sintered magnet can be reduced.

Light rare earth elements as used herein include the following elements: Sc, La, Ce, Pr, Nd, Pm, Sm, Eu, and Gd.

According to embodiments described herein, the shell portion comprises an alloy comprising at least one composition of elements a) to l) selected from group I and, optionally, at least one element selected from group II, group I:
a) Al, Ni and Co;
b) Sm and Co;
c) Sm and Fe;
d) Sm, Fe and N;
e) Fe and N;
f) Mn, Al and C;
g) Mn and Bi;
h) hard ferrite;
i) Fe, B, and at least one rare earth element;
j) Fe, C, and at least one rare earth element;
k) Nd, Fe and B
l) Nd, Fe, B, and at least one rare earth element; and
group II:
Al, Ce, Co, Cu, Ga, La, Nb, Pr, Ti and Zr, and at least one heavy rare earth element, preferably at least one of Dy and Tb.

Preferably, the shell portion consists of an alloy comprising at least one composition of elements a) to l) selected from group I and, optionally, at least one element selected from group II.

The above-mentioned compositions of the core portion and the shell portion are free of rare earth elements other than those defined.

By selecting composition of elements a), e), or j) for the shell portion particularly inexpensive magnets can be obtained. Thereby, the production costs of the sintered magnet can be reduced.

Heavy rare earth elements as used herein include the following elements: Y, Tb, Dy, Ho, Er, Tm, Yb, and Lu.

Examples for hard ferrites (composition of elements i) are: Strontium ferrites [$SrFe_{12}O_{19}(SrO \cdot 6Fe_2O_3)$], Barium ferrites $BaFe_{12}O_{19}$ ($BaO \cdot 6Fe_2O_3$) and Cobalt ferrites $CoFe_2O_4(CoO \cdot Fe_2O_3)$.

The alloy of the core portion is different from the alloy of the shell portion. According to embodiments described herein, the core portion comprises an alloy comprising a composition of elements, selected from group I, which is different from the composition of elements, selected from group I, being included in the alloy of the shell portion. In an exemplary embodiment, the core portion includes an alloy comprising AlNiCo and the shell portion includes an alloy comprising NdFeB. According to another exemplary embodiment, the core portion includes an alloy comprising NdFeB and the shell portion includes an alloy comprising NdFeB and Dy. In the exemplary embodiments, the coercivity of the shell portion is higher than the coercivity of the diffusion portion and the core portion.

According to embodiments described herein, the total amount of the at least one element of group II is 0.05 to 20.0 mass % in the core portion. Preferably, the total amount of the at least one element of group II is 0.5 to 15.0 mass % in the core portion. More preferably, the total amount of the at least one element of group II is 0.1 to 10.0 mass % in the core portion.

According to embodiments described herein, the total amount of the at least one element of group II is 0.05 to 20.0 mass % in the shell portion. Preferably, the total amount of the at least one element of group II is 0.5 to 15.0 mass % in the shell portion. More preferably, the total amount of the at least one element of group II is 0.1 to 10.0 mass % in the shell portion.

According to embodiments described herein, an average magnetic grain size of the core portion, the shell portion, and the diffusion portion of the sintered magnet is 0.3 to 20.0 μm, preferably 0.3 to 15.0 μm, and more preferably 0.3 to 10.0 μm.

According to embodiments described herein, the shell portion surrounds the core portion at least partially. The shell portion may be provided towards the outside of the magnet relative to the core portion. In particular, the shell portion may be provided at an outer face (surface) of the magnet, or further towards a (closest) outer surface of the magnet than the core portion.

According to embodiments described herein, the shell portion extends two-dimensionally over an area corresponding to a substantial portion of the surface of the magnet, such as over at least 10%, or at least 30%, or even at least half of the total surface of the magnet. Thereby, the ability of the magnet to withstand various external magnetic fields without becoming demagnetized is further enhanced. According to embodiments described herein, the shell portion substantially covers at least one face of the magnet (the face being surrounded by edges of the magnet), e.g., extends two-dimensionally over at least 50%, or over at least 80% of the at least one face of the magnet, or even covers the at least one face essentially entirely. According to embodiments described herein, the shell portion essentially covers a plurality of faces of the magnet, in particular mutually opposing faces. According to embodiments described herein, the shell portion essentially covers at least half of the faces of the magnet.

The above-described sintered magnet is producible by the following manufacturing method of a sintered magnet, including the following steps:
forming a green body by magnetically aligning, a first magnetic powder and a second magnetic powder so that the second magnetic powder is provided on at least a portion of the first magnetic powder; and
sintering the green body in a sintering furnace to form a sintered magnet having a core portion, a shell portion and a diffusion portion between the core portion and the shell portion.

The shell portion of the sintered magnet has a coercivity which is at least 30 kA/m larger than the coercivity of the core portion of the sintered magnet. In the diffusion portion, the coercivity is not less than the coercivity of the core portion and not larger than the coercivity of the shell portion and the value of the coercivity gradually increases from the core portion towards the shell portion. The thickness of the core portion is not less than 1 mm and the total thickness of the shell portion and the diffusion portion is at least 5 mm.

The above-described manufacturing process of a sintered magnet is a manufacturing process in which the sintered magnet is made from metal powders. An advantage of the powder metallurgy route is that the powders used to form the sintered magnet do not need to be melted in order to form the desired shape of the sintered magnet. Hence, materials having a high melting point, such as Sm, Co and most of the rare earth elements, can be processed cost-effectively. A further advantage arises from the possibility of a wide range of possible designs for the sintered magnet.

According to embodiments described herein, the green body is formed by magnetically aligning, and optionally compressing, a plurality of magnetic powders so that each of the magnetic powders is provided on at least a portion of another one of the magnetic powders. Preferably, the first magnetic powder, the second magnetic powder and the third magnetic powder are magnetically aligned, and optionally compressed, so that the second magnetic powder is provided on at least a portion of the third magnetic powder and the third magnetic powder is provided on at least a portion of the first magnetic powder.

In the manufacturing process of the sintered magnet, first of all, the green body is formed. For this, a first magnetic powder is provided in a die for giving it the desired shape. Then, the first magnetic powder is magnetically aligned and, optionally, compressed in the die. After that, the second magnetic powder, or optionally the third magnetic powder, is magnetically aligned and, optionally, compressed in the die, whereby the second magnetic powder or the third magnetic powder is positioned on at least a portion of the first magnetic powder in the die. After that, the second magnetic powder is filled in and magnetically aligned and, optionally, compressed in the die, whereby the second magnetic powder is positioned on at least a portion of the third magnetic powder in the die. In other words, the first magnetic powder which is present in the die is completely or partly covered by the second magnetic powder or the third magnetic powder which is put on top of and/or around the first magnetic powder in the die, and optionally the third magnetic powder is then completely or partly covered by the second magnetic powder which is put on top of and/or around the third magnetic powder in the die. Alternatively, the first magnetic powder is provided in a die and the second magnetic powder is positioned on at least a portion of the first magnetic powder in the die. After that, the first magnetic powder and the second magnetic powder are magnetically aligned and, optionally, compressed in the die. In another example, the first magnetic powder is provided in a die and the third magnetic powder is positioned on at least a portion of the first magnetic powder in the die; and the second magnetic powder is positioned on at least a portion of the third magnetic powder in the die. After that, the first magnetic powder, the second magnetic powder and the third magnetic powder are magnetically aligned and, optionally, compressed in the die.

The first magnetic powder and/or the second magnetic powder and/or the third magnetic powder may be prepared by crushing, grinding, chemical reactions, electrolytic deposition, melt-spinning, milling of cast alloys, preferably in the form of strips, high-temperature reduction of the corresponding nitrides and carbides, atomizing by directing a stream of molten material through a high-temperature plasma jet or flame. The first magnetic powder and/or the second magnetic powder and/or the third magnetic powder may be one magnetic powder with a certain material composition or may be a mixture of more than one magnetic powder with a certain material composition. Hence, the first magnetic powder and/or the second magnetic powder and/or the third magnetic powder may each comprise several magnetic powders having different material compositions. For example, the first magnetic powder may comprise three different magnetic powders, whereby each of the magnetic powder has a different material composition.

The magnetic alignment of the first magnetic powder and the second magnetic, and optionally the third magnetic powder, is performed by applying an external magnetic field to the first magnetic powder and the second magnetic powder, and optionally the third magnetic powder, in order to orientate the magnetic particles such that the preferred magnetic orientation aligns with the external magnetic field. After removing the external magnetic field, the magnetic particles remain in their new orientation and the aligned magnetic particles produce a magnetic field. Thereby, the green body, i.e. the first magnetic powder and the second magnetic powder, and optionally the third magnetic powder, are magnetized.

Preferably, the green body is formed by magnetically aligning and compressing a first magnetic powder and a second magnetic powder so that the second magnetic powder is provided on at least a portion of the first magnetic powder or by magnetically aligning and compressing the first magnetic powder, the second magnetic powder and the third magnetic powder so that the second magnetic powder is provided on at least a portion of the third magnetic powder and the third magnetic powder is provided on at least a portion of the first magnetic powder. Preferably, the compression of the first magnetic powder and the second magnetic powder, and optionally the third magnetic powder, before sintering, is performed under a pressure of 50 to 500 MPa. Thereby, the first magnetic powder and/or second magnetic powder and/or third magnetic powder is compacted during die forming the green body. As a result, the first magnetic powder and/or second magnetic powder and/or third magnetic powder is compacted into the desired shape. After that, the green body is ejected from the die. Preferably, the pressing force is a uniaxial pressing force, an isostatic pressing force or a uniaxial pressing force, followed by an isostatic pressing force. Isostatic pressing as used herein includes cold isostatic pressing and hot isostatic pressing. Cold isostatic pressing is performed at ambient temperature, preferably in a pressure vessel filled with water or a solution containing glycerin, water, an oil, etc. Hot isostatic pressing is performed at elevated temperature, preferably in a high pressure containment vessel. In both cold isostatic pressing and hot isostatic pressing, pressure is transmitted uniformly in all directions in order to compress the material to be processed.

Before aligning and, optionally, compressing the first magnetic powder and the second magnetic powder, and optionally the third magnetic powder, additives, such as a lubricant, can be blended with the first magnetic powder and/or the second magnetic powder and/or the third magnetic powder in order to facilitate the formation of the green body.

Figure 2:
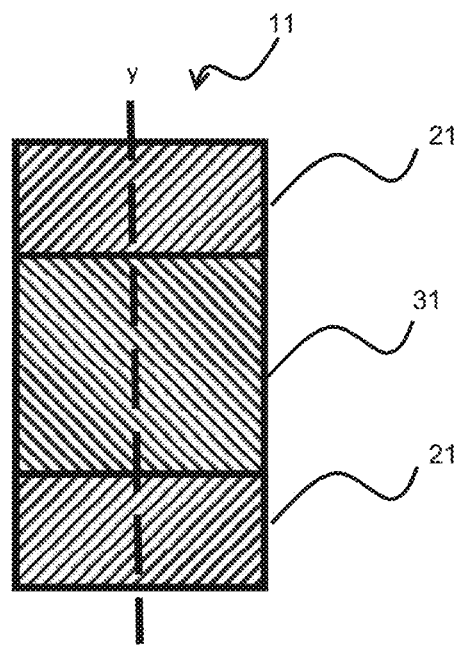
FIG. 2 shows a schematic illustration for a preform of a sintered magnet according to embodiments described herein.

FIG. 2 exemplarily shows a preform 11 of an example of the sintered magnet. FIG. 2 shows a cross-section of the preform 11, which is an arrangement of the first magnetic powder 21 and the second magnetic powder 31 prior to sintering. The first magnetic powder 21 and the second magnetic powder 31 are arranged in the preform 11 so that in the y-axis direction a layer of the first magnetic powder 21 is disposed atop a layer of the second magnetic powder 31 which is disposed atop another layer of the first magnetic powder 21.

After formation of the green body, the green body is sintered in a sintering furnace. A sintering furnace as used herein is a device in which a thermal treatment above room temperature can be performed. The temperatures realized in the sintering furnace are in the range of 20° C. to 2000° C. Under the applied heat in the sintering furnace, the porosity is reduced and the density increased and the powder particles are bonded to each other to form a solid piece, i.e. the sintered magnet. The time during which sintering is performed, i.e. the sintering time, is 0.1 to 20 hours, preferably 0.5 to 15 hours, and more preferably 1 to 10 hours. The temperature in the sintering furnace, i.e. the sintering temperature, is 400° C. to 1200° C., preferably 500° C. to 1100° C., and more preferably 600° C. to 900° C. Optionally, the sintering is performed under an inert gas in order to prevent chemical reactions of the green body with the surrounding atmosphere during the sintering process. The inert gas has a pressure of 133 to 1013 Pa. Preferably, the inert gas includes at least one of $N_2$, Ar, and He.

Preferably, the green body is not only sintered but also annealed to form a sintered magnet having a core portion, a shell portion and a diffusion portion between the core portion and the shell portion. Preferably, the sintered green body is annealed at a temperature of 300° C. to 700° C. for a duration of 1 to 10 hours, preferably at a temperature of 500° C. to 650° C. for a duration of 1 to 8 hours, and more preferably at a temperature of 550° C. to 600° C. for a duration of 1 to 6 hours. The annealing process can be performed in the sintering furnace or in an annealing furnace.

As a result of sintering, and optionally annealing, the green body, the sintered magnet having the core portion, the shell portion and the diffusion portion between the core portion and the shell portion is formed. The core portion is mainly made of the first magnetic powder and the shell portion is mainly made of the second magnetic powder. In other words, during sintering, and optionally annealing, the region of densified mainly pure first magnetic powder forms the core portion of the sintered magnet and the region of densified mainly pure second magnetic powder forms the shell portion. The diffusion portion is formed during the sintering process, and optionally annealing process, whereby constituents of the densified first magnetic powder and the second magnetic powder, and optionally the third magnetic powder, diffuse into each other and locally equilibrate. The diffusion portion does not have the same chemical composition of the first magnetic powder and the second magnetic powder at any location of the diffusion portion but the diffusion portion has a region with a low content of the first magnetic powder and a high content of the second magnetic powder and a region with a high content of the first magnetic powder and a low content of the second magnetic powder. In an exemplary case, the region with a low content of the first magnetic powder and a high content of the second magnetic powder may be a region having a higher coercivity than the region with a high content of the first magnetic powder and a low content of the second magnetic powder. In another example the diffusion portion does not have the same chemical composition of the first magnetic powder, the second magnetic powder and third magnetic powder at any location of the diffusion portion but the diffusion portion has different regions in which the chemical compositions of the first magnetic powder, the second magnetic powder and third magnetic powder vary. For example, there may be a region which has a high content of the first magnetic powder and a low content of the third magnetic powder but which has not any second magnetic powder.

Figure 3:
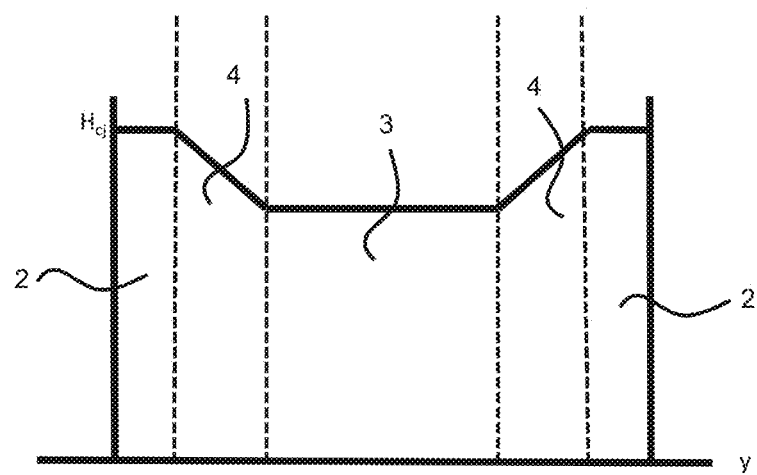
FIG. 3 shows a schematic illustration for a coercivity profile of a sintered magnet according to embodiments described herein.

FIG. 3 shows a coercivity profile taken at a cross-section of an example of a sintered magnet according to embodiments described herein. For example, after sintering, the preform shown in FIG. 2 has a coercivity profile along the cross-section taken at the y-axis as shown in FIG. 3. After sintering, the preform 11 shown in FIG. 2 may have the form of the sintered magnet shown in FIG. 1b. This sintered magnet has a core portion 3, a diffusion portion 4 and a shell portion 2. Also in the coercivity profile, the core portion 3, the diffusion portion 4 and the shell portion 2 are shown. As can be seen from FIG. 3, the core portion 3 has a lower coercivity than the shell portion 2 and the diffusion portion 4, whereas the coercivity of the diffusion portion 4 lies between the coercivity of the core portion 3 and the shell portion 2. In particular, the diffusion portion 4 has a coercivity gradient, namely the value of the coercivity in the diffusion portion 4 gradually increases from the core portion 3 towards the shell portion 4.

The shell portion of the resulting sintered magnet has a coercivity which is at least 30 kA/m (in alternative embodiments, by at least 10 kA/m, preferably by 20 kA/m) larger than the coercivity of the core portion. The diffusion portion of the resulting sintered magnet has a coercivity which is not less than the coercivity of the core portion and not larger than the coercivity of the shell portion and the value of the coercivity gradually increases from the core portion towards the shell portion.

The thickness of the core portion is not less than 1 mm and the total thickness of the shell portion and the diffusion portion is at least 5 mm. Preferably, the thickness of the core portion is not less than 3 mm and the total thickness of the shell portion and the diffusion portion is at least 8 mm. More preferably, the thickness of the core portion is not less than 3 mm and the total thickness of the shell portion and the diffusion portion is at least 10 mm. The thickness of the core portion, the shell portion and the diffusion portion may not be constant over their respective entire dimension. The thickness of a certain portion, i.e. the core portion, the shell portion or the diffusion portion, of the sintered magnet as used herein is defined as the smallest thickness of the respective portion over its entire dimension.

The above-described manufacturing process may also be used for recycling used magnets. By processing used magnets into powder particles, these powder particles can be used as the first magnetic powder and/or the second magnetic powder and/or the third magnetic powder. The first magnetic powder and/or the second magnetic powder and/or the third magnetic powder is then magnetically aligned, optionally compressed, sintered and optionally annealed, as described above.

According to embodiments described herein, the above-described sintered magnet is producible by forming a green body by magnetically aligning, and optionally compressing, a first magnetic powder and a second magnetic powder so that the second magnetic powder is provided on at least a portion of the first magnetic powder, sintering the green body in a sintering furnace, and optionally annealing the sintered green body, to form the sintered magnet having the core portion, the shell portion and the diffusion portion between the core portion and the shell portion, wherein the sintering time is 0.1 to 20 hours and the sintering temperature is 400° C. to 1200° C., wherein, optionally, the annealing is performed at a temperature of 300° C. to 700° C. for a duration of 1 to 10 hours, wherein, optionally, the sintering is performed under an inert gas having a pressure of 133 to 1013 Pa, the inert gas preferably comprising at least one of $N_2$, Ar, and He, and wherein, optionally, the compression of the first magnetic powder and the second magnetic powder is performed under a pressure of 50 to 500 MPa before sintering, wherein, preferably, the pressing force is a uniaxial pressing force, an isostatic pressing force or a uniaxial pressing force, followed by an isostatic pressing force.

According to embodiments of the manufacturing method described herein, the first magnetic powder and/or the second magnetic powder and/or the third magnetic powder are crystalline and anisotropic powders with an average particle size of 0.3 to 20.0 μm, preferably of 0.5 to 15.0 μm, and more preferably 1.0 to 10.0 μm. Preferably, the first magnetic powder and the second magnetic powder have different particle sizes. The third magnetic powder may be a mixture of the first magnetic powder and the second magnetic powder. Preferably, the first magnetic powder, the second magnetic powder and the third magnetic powder have different particle sizes.

The embodiments described in connection with the sintered magnet also apply correspondingly to the above-described manufacturing method of a sintered magnet. Thus, the above-described features are to be understood as also being features for the described manufacturing method of a sintered magnet.

Using the above-described manufacturing process, the sintered magnet has a shape which is predetermined by the green body and, after shrinkage, has a porosity of less than 5%.

According to a second aspect of the present disclosure an electrical machine includes at least one sintered magnet as described above. The sintered magnet is preferably disposed at the rotor, more preferably positioned on the rotor.

According to a third aspect of the present disclosure a use of the above-described sintered magnet for an electrical machine is provided. The sintered magnet is preferably disposed at the rotor, more preferably positioned on the rotor.

Figure 4:
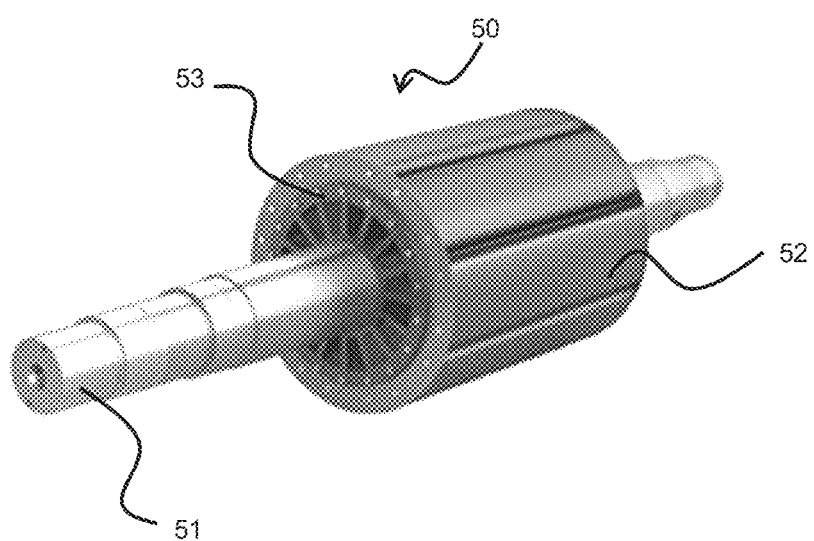
FIG. 4 shows a schematic illustration for a rotor of an electrical machine according to embodiments described herein.

FIG. 4 shows a rotor 50 of an electrical machine, such as an electrical generator. The rotor 50 has a shaft 51 on which magnetic laminations 52 and a sintered magnet 53 according to the embodiments described herein are positioned. For example, the sintered magnet 53 may be a permanent magnet. The magnetic laminations 52 may be soft magnetic laminations.

According to embodiments described herein, the electrical machine comprises at least one of an electric motor, a generator, a power transformer, an instrument transformer, a linear motion device and a magnetically biased inductor, and a magnetic actuator.

The invention claimed is:

1. A sintered magnet, the sintered magnet comprising a core portion, a shell portion arranged at an outer part of the sintered magnet, and a diffusion portion arranged at least partially between the core portion and the shell portion,
    wherein the shell portion has a coercivity which is at least 30 kA/m larger than the coercivity of the core portion,
    wherein, in the diffusion portion, the coercivity is not less than the coercivity of the core portion and not larger than the coercivity of the shell portion and the value of the coercivity gradually increases from the core portion towards the shell portion, and
    wherein the thickness of the core portion is not less than 1 mm and the total thickness of the shell portion and the diffusion portion is at least 5 mm.

2. The sintered magnet according to claim 1, wherein the diffusion portion has a coercivity gradient $|\nabla H_c|$ of at least 5 (kA/m)/mm throughout the diffusion portion.

3. The sintered magnet according to claim 1, wherein the average density of the sintered magnet is 4.0 g/cm$^3$ to 8.5 g/cm$^3$.

4. The sintered magnet according to claim 1, wherein the coercivity of the core portion is at least 300 kA/m and less than 5000 kA/m and the coercivity of the shell portion is not more than 5000 kA/m.

5. The sintered magnet according to claim 1, wherein the core portion comprises an alloy comprising at least one composition of elements a) to l) selected from group I
    group I:
    a) Al, Ni and Co;
    b) Sm and Co;
    c) Sm and Fe;
    d) Sm, Fe and N;
    e) Fe and N;
    f) Mn, Al and C;
    g) Mn and Bi;
    h) hard ferrite;
    i) Fe, B, and at least one rare earth element;
    j) Fe, C, and at least one rare earth element;
    k) Nd, Fe and B
    l) Nd, Fe, B, and at least one rare earth element.

6. The sintered magnet according to claim 5, wherein the core portion comprises at least one one element selected from group II,
    group II:
    Al, Co, Cu, Ga, Nb, Ti, Zr, and at least one light rare earth element.

7. The sintered magnet according claim 6, wherein the total amount of the at least one element of group II is 0.05 to 20.0 mass % in the core portion.

8. The sintered magnet according to claim 1, wherein the shell portion comprises an alloy comprising at least one composition of elements a) to l) selected from group I
    group I:
    a) Al, Ni and Co;
    b) Sm and Co;
    c) Sm and Fe;
    d) Sm, Fe and N;

e) Fe and N;
f) Mn, Al and C;
g) Mn and Bi;
h) hard ferrite;
i) Fe, B, and at least one rare earth element;
j) Fe, C, and at least one rare earth element;
k) Nd, Fe and B
l) Nd, Fe, B, and at least one rare earth element.

9. The sintered magnet according to claim 8, wherein the shell portion comprises at least one element selected from group II, Group II
Al, Ce, Co, Cu, Ga, La, Nb, Pr, Ti and Zr, and at least one heavy rare earth element.

10. The sintered magnet according claim 9, wherein the total amount of the at least one element of group II is 0.05 to 20.0 mass % in the shell portion.

11. The sintered magnet according to claim 1, wherein the sintered magnet is producible by forming a green body by magnetically aligning a first magnetic powder and a second magnetic powder so that the second magnetic powder is provided on at least a portion of the first magnetic powder,
sintering the green body in a sintering furnace to form the sintered magnet having the core portion, the shell portion and the diffusion portion between the core portion and the shell portion,
wherein the sintering time is 0.1 to 20 hours and the sintering temperature is 400° C. to 1200° C.

12. The sintered magnet according to claim 11, wherein the forming includes compressing,
wherein said sintering includes annealing the sintered green body,
wherein, the annealing is performed at a temperature of 300° C. to 700° C. for a duration of 1 to 10 hours,
wherein the sintering is performed under an inert gas having a pressure of 133 to 1013 Pa, the inert gas preferably comprising at least one of $N_2$, Ar, and He, and
wherein the compression of the first magnetic powder and the second magnetic powder is performed under a pressure of 50 to 500 MPa before sintering, wherein the pressing force is one of a uniaxial pressing force, an isostatic pressing force or a uniaxial pressing force, followed by an isostatic pressing force.

13. The sintered magnet according to claim 1, wherein
the shell portion extends two-dimensionally covering at least one of
at least 10% of the total surface of the magnet;
at least half of the total surface of the magnet;
at least 50% of at least one face of the magnet;
at least one face of the magnet essentially entirely.

14. The electrical machine according to claim 13, wherein the electrical machine comprises at least one of an electric motor, a generator, a power transformer, an instrument transformer, a linear motion device and a magnetically biased inductor, and a magnetic actuator.

15. An electrical machine comprising at least one sintered magnet according to claim 1.

16. A manufacturing method of a sintered magnet, comprising
forming a green body by magnetically aligning a first magnetic powder and a second magnetic powder so that the second magnetic powder is provided on at least a portion of the first magnetic powder,
sintering the green body in a sintering furnace to form a sintered magnet having a core portion (3), a shell portion (2) and a diffusion portion (4) that is arranged at least partially between the core portion and the shell portion,
wherein the shell portion has a coercivity which is at least 30 kA/m larger than the coercivity of the core portion,
wherein, in the diffusion portion, the coercivity is not less than the coercivity of the core portion and not larger than the coercivity of the shell portion and the value of the coercivity gradually increases from the core portion towards the shell portion, and
wherein the thickness of the core portion is not less than 1 mm and the total thickness of the shell portion and the diffusion portion is at least 5 mm.

17. The manufacturing method according to claim 16,
wherein the green body is formed by magnetically aligning a first magnetic powder, a second magnetic powder and a third magnetic powder so that the second magnetic powder is provided on at least a portion of the third magnetic powder and the third magnetic powder is provided on at least a portion of the first magnetic powder.

18. The manufacturing method according to claim 17,
wherein at least one of the first magnetic powder and the third magnetic powder comprises an alloy comprising at least one composition of elements a) to l) selected from group I,
group I:
a) Al, Ni and Co;
b) Sm and Co;
c) Sm and Fe;
d) Sm, Fe and N;
e) Fe and N;
Mn, Al and C;
g) Mn and Bi;
h) hard ferrite;
i) Fe, B, and at least one rare earth element;
j) Fe, C, and at least one rare earth element;
k) Nd, Fe and B
l) Nd, Fe, B, and at least one rare earth element.

19. The manufacturing method according to claim 18, wherein at least one of the first magnetic powder and the third magnetic powder comprises at least one element selected from group II,
group II
Al, Co, Cu, Ga, Nb, Ti, Zr, and at least one light rare earth element.

20. The manufacturing method according to claim 19, wherein the total amount of the at least one element of group II is 0.05 to 20.0 mass % in the core portion.

21. The manufacturing method according to claim 17,
wherein at least one of the second magnetic powder and the third magnetic powder comprises an alloy comprising at least one composition of elements a) to l) selected from group I,
group I:
a) Al, Ni and Co;
b) Sm and Co;
c) Sm and Fe;
d) Sm, Fe and N;
e) Fe and N;
f) Mn, Al and C;
g) Mn and Bi;
h) hard ferrite;
i) Fe, B, and at least one rare earth element;
j) Fe, C, and at least one rare earth element;
k) Nd, Fe and B
l) Nd, Fe, B, and at least one rare earth element.

22. The manufacturing method according to claim 21, wherein at least one of the second magnetic powder and the third magnetic powder comprises an at least one element selected from group II, group II:

Al, Ce, Co, Cu, Ga, La, Nb, Pr, Ti and Zr, and at least one heavy rare earth element.

23. The manufacturing method according to claim 22, wherein the total amount of the at least one element of group II is 0.05 to 20.0 mass % in the shell portion.

24. The manufacturing method according to claim 17, wherein the first magnetic powder and/or the second magnetic powder and/or the third magnetic powder are crystalline and anisotropic powders with an average particle size of 0.3 to 20.0 μm.

25. The manufacturing method according to claim 16, wherein the diffusion portion has a coercivity gradient $|\nabla H_c|$ of at least 5 (kA/m)/mm throughout the diffusion portion.

26. The manufacturing method according to claim 16, wherein the sintering time is 0.1 to 20 hours and the sintering temperature is 400° C. to 1200° C.

27. The manufacturing method according to claim 16, wherein the sintering is performed under an inert gas having a pressure of 133 to 1013 Pa, the inert gas preferably comprising at least one of $N_2$, Ar, and He.

28. The manufacturing method according to claim 16, wherein, before sintering, the compression of the first magnetic powder and the second magnetic powder is performed under a pressure of 50 to 500 MPa, and wherein the pressing force is one of a uniaxial pressing force, an isostatic pressing force or a uniaxial pressing force, followed by an isostatic pressing force.

29. The manufacturing method according to claim 16, wherein the coercivity of the core portion is at least 300 kA/m and less than 5000 kA/m and the coercivity of the shell portion is not more than 5000 kA/m.

30. The manufacturing method according to claim 16, wherein the magnetic powders are arranged so that the shell portion of the sintered magnet extends two-dimensionally covering at least one of at least 10% of the total surface of the magnet;

at least half of the total surface of the magnet;

at least 50% of at least one face of the magnet;

at least one face of the magnet essentially entirely.

31. The manufacturing method according to claim 16, wherein the forming a green body includes compressing, wherein the sintering includes annealing the sintered green body.

32. The manufacturing method according to claim 31, wherein, the annealing is performed at a temperature of 300° C. to 700° C. for a duration of 1 to 10 hours; and wherein the sintering time is 0.1 to 20 hours and the sintering temperature is 400° C. to 1200° C.

* * * * *